Feb. 2, 1971  G. R. RYAN  3,559,245
MOLDING APPARATUS
Filed April 2, 1968  4 Sheets-Sheet 1

Inventor
George R. Ryan
By Hibben, Noyes & Bicknell
Attorneys

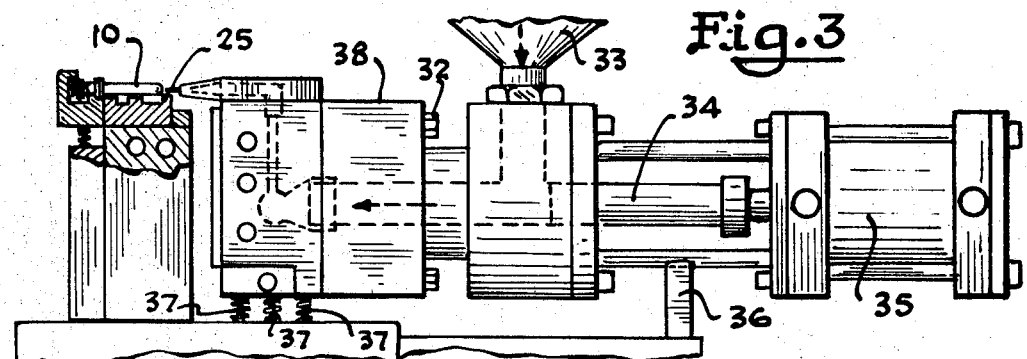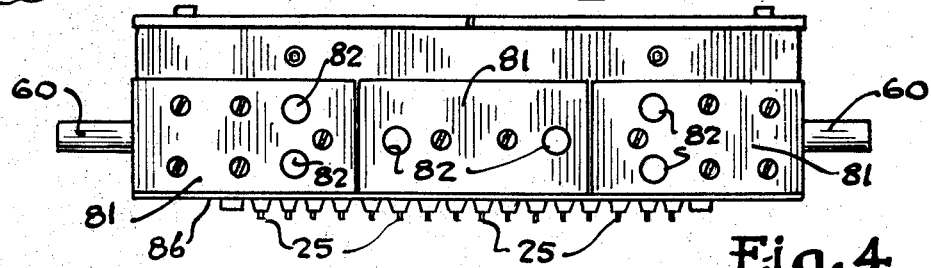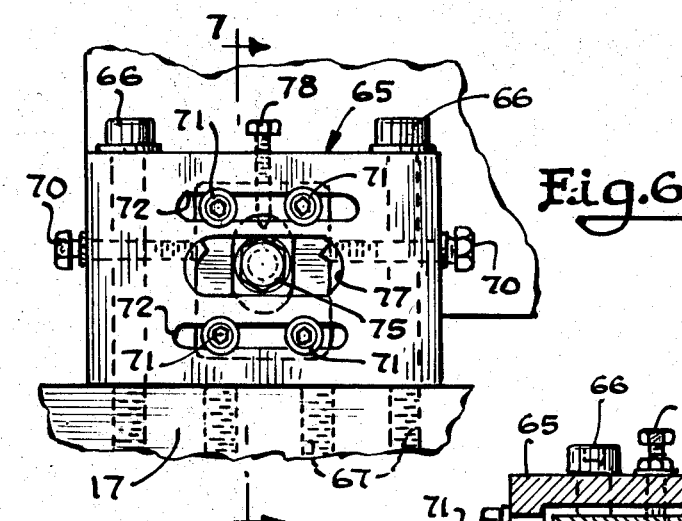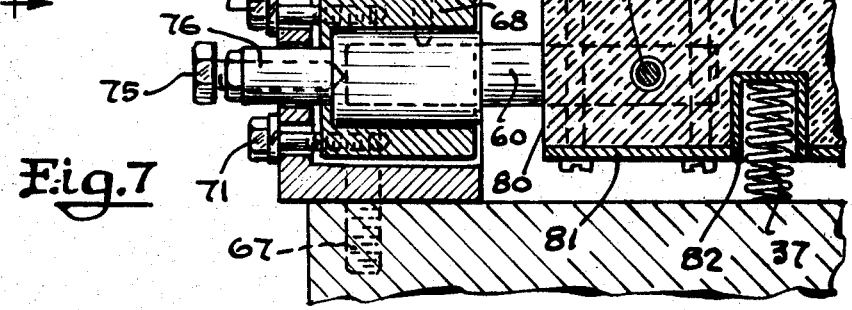

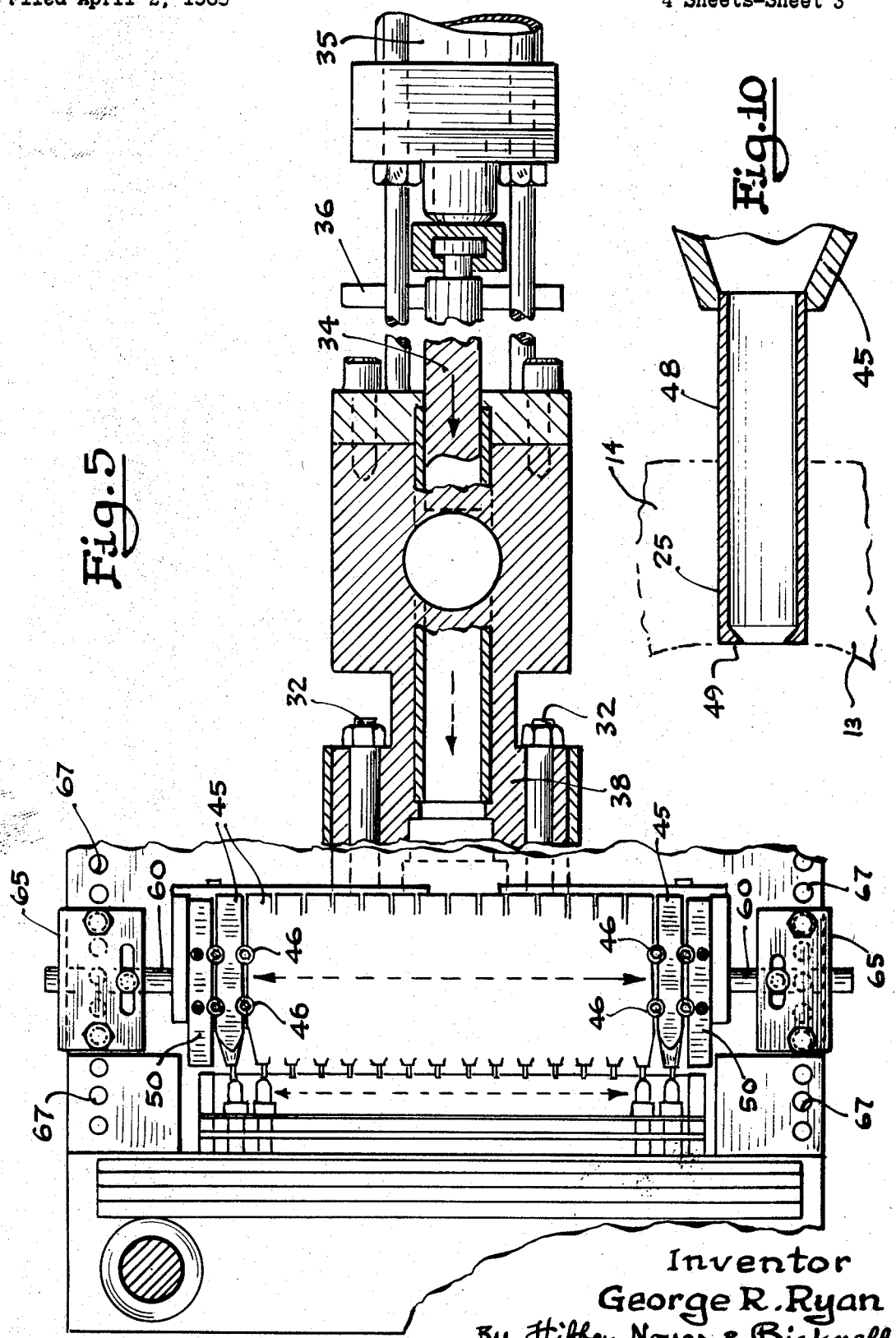

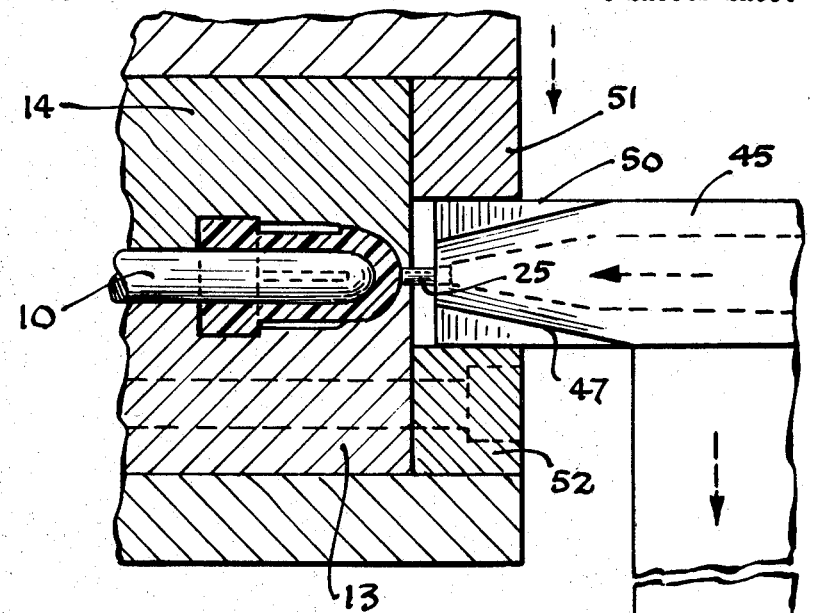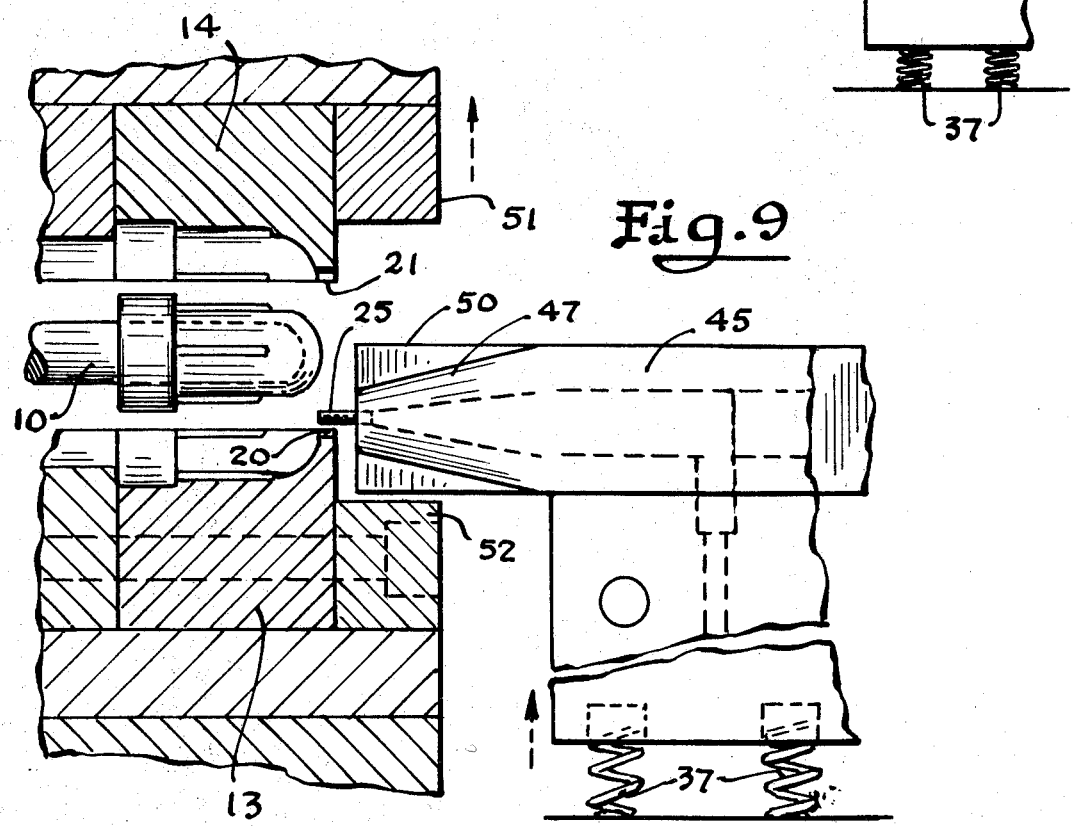

United States Patent Office 3,559,245
Patented Feb. 2, 1971

3,559,245
MOLDING APPARATUS
George R. Ryan, 1431 Henry Place,
Waukegan, Ill. 60085
Filed Apr. 2, 1968, Ser. No. 718,160
Int. Cl. B29f 1/03
U.S. Cl. 18—30                                10 Claims

ABSTRACT OF THE DISCLOSURE

Runnerless molding apparatus employing cooled mold sections and a heated manifold assembly in which the only contact between the heated manifold assembly and the cooled mold sections is by injection nozzles extending outwardly from the manifold assembly and movable transversely into an out of contact with the mold sections between each molding cycle.

---

This invention relates generally to runnerless molding apparatus and more particularly to improved means for injecting a plasticized thermoplastic material into a mold cavity of a runnerless molding apparatus.

The usual runnerless injection molding apparatus, also known as a hot runner or insulated runner molding apparatus, comprises two mold sections with one of the mold sections normally stationary and having a built-in heated manifold and nozzle section fixedly mounted thereon. The other mold section is movable with respect to the first mold section and forms when in sealable engagement with the first mold section one or more mold cavities into which the thermoplastic material is injected through the manifold and nozzle section. A mold core can be positioned within each mold cavity. The means used for injecting the thermoplastic material into the mold cavities also includes a hopper into which unplasticized molding composition is introduced, a heating cylinder wherein a thermoplastic molding composition is heated and plasticized, and an injection ram or screw for forcing the plasticized composition from the heated cylinder into the heated manifold and nozzle section connected to the mold sections. The nozzle section of the manifold includes a plurality of individual injection nozzles which are aligned with appropriate transfer passages leading into the mold cavities with the ends of the injection nozzles feeding the plasticized molding material to the mold cavities tangent to the inner wall forming the mold cavities. As soon as the thermoplastic material has solidified in the mold cavities, the mold sections are separated and the molded articles are withdrawn from the mold cavities. Thereafter, the mold is again closed and the molding cycle repeated.

The conventional multiple cavity hot runner mold section which contains the heated manifold and nozzle section is a very complicated unit which must be heavily constructed to withstand the high forces necessary to clamp the mold sections together during the injection of the plastic. This mold section also must contain insulating means for maintaining the manifold and nozzles at a relatively high temperature in order to provide a uniform flow of the plasticized molding composition into the mold cavities while keeping the mold cavities at a relatively low temperature in order to effect rapid solidification of the thermoplastic composition in the mold cavities. This temperature differential poses many problems, since the mold section and the manifold must at all times remain sealably bolted together in the runnerless molding apparatus presently in general use.

The contact between the hot and cold sections of the mold and the manifold creates serious temperature control problems, particularly in multi-cavity molds containing many individual mold cavities. For example, the thermoplastic material will frequently solidify or "freeze" in one or more mold gates or injection nozzle passages, thus blocking the passages and preventing mold cavities associated therewith being filled with molding composition. Very elaborate and expensive mold constructions have been used to prevent the foregoing type of blockage, including equipping each injection nozzle with its own heating element and temperature controlling device.

It is therefore an object of the present invention to provide an improved runnerless injection molding apparatus which avoids excessive cooling of the thermoplastic material.

It is a further object of the present invention to provide improved runnerless injection molding apparatus which eliminates blockage due to plasticized material freezing in the mold gates.

It is a still further object of the present invention to provide runnerless molding apparatus having an improved injection molding nozzle which prevents objectionable solidification of plasticized molding material in the injection molding nozzle between molding cycles.

It is another object of the present invention to provide an improved runnerless injection molding apparatus in which the molding composition injection means and the mold cavity sections are distinct units which are independently mounted and supported.

It is another object of the present invention to provide runnerless molding apparatus having improved means for accurately aligning one or more mold injection nozzles of a manifold assembly with corresponding gates of one or more mold cavities.

It is still another object of the present invention to provide a heated manifold assembly for multiple cavity molds suitable for use with a number of different molds and plastics without the necessity of disassembly and reassembly of the heated manifold assembly.

Other objects of the present invention will be apparent to one skilled in the art form the following detailed description and claims when read in conjunction with the accompanying drawing, wherein FIG. 1 is a fragmentary perspective view of a runnerless molding apparatus embodying the present invention.

FIG. 3 is a fragmentary side elevational view partially in vertical section showing the apparatus in FIG. 1 with means for supplying molding material thereto.

FIG. 4 is a bottom plan view of a portion of the apparatus of FIG. 3.

FIG. 5 is a fragmentary top plan view partially in horizontal section of the apparatus shown in FIG. 3.

FIG. 6 is a fragmentary side elevational view of a portion of the apparatus shown in FIG. 1.

FIG. 7 is a fragmentary vertical sectional view taken along the line 7—7 of FIG. 6.

FIG. 8 is a fragmentary schematic side elevational view partially in vertical section showing the molding apparatus of FIG. 1 during injection of plasticized material into the closed mold.

FIG. 9 is a fragmentary schematic side elevational view partially in vertical section of the molding apparatus of FIG. 1 with the mold in open position at the end of a molding cycle.

FIG. 10 is a fragmentary vertical sectional view of another portion of the apparatus shown in FIG. 3.

Figures 1, 2:
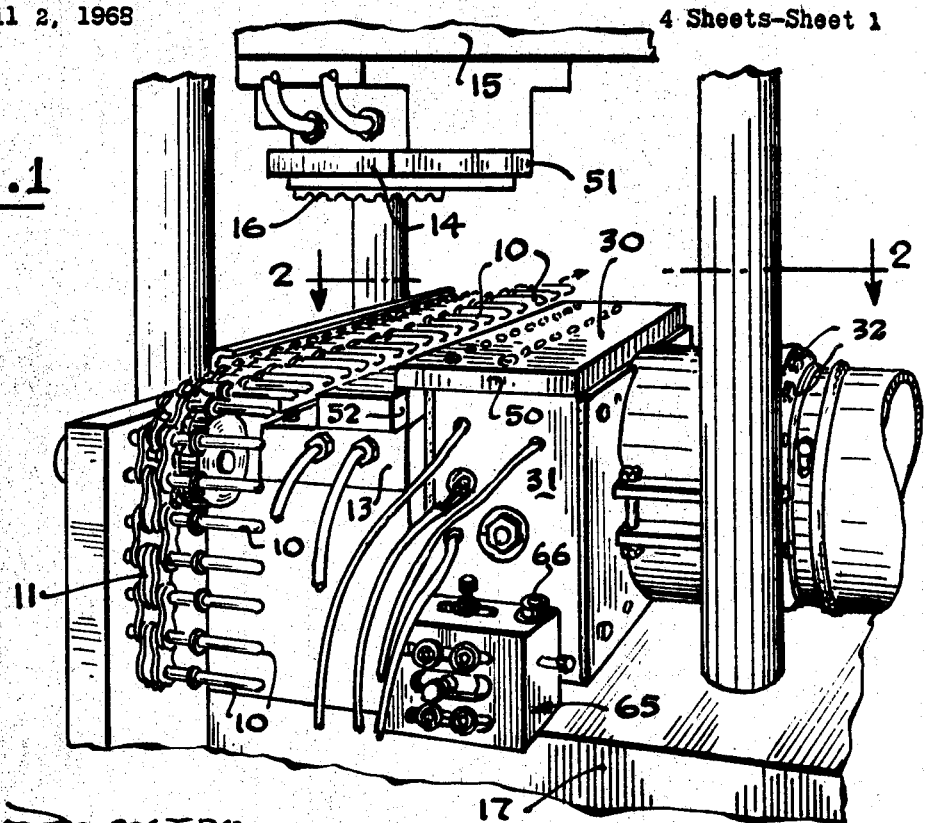
FIG. 2 is a fragmentary vertical sectional view taken along the line 2—2 of FIG. 1.

Referring to the accompanying drawing, there is shown in FIG. 1 an apparatus of the type described in the George R. Ryan Pat. No. 3,135,993 for molding a thermoplastic compound, such as polyethylene plastic, about a mold insert element or mold core pin 10 which preferably forms an integral extension of a pivotal link pin of a roller link chain 11 wherein the individual links are spaced by conventional pin link plates and locked in position by a chain pin clip. The endless chain 11 advances the mold core elements or pins 10 toward spaced upper and lower mold sections 13, 14 forming the mold cavity. The chain 11 comes to rest when a predetermined group of the mold core pins 10 are directly over the lower mold section 13 of the mold on the lower chain centering bar 5 which is resiliently supported by spring means 6 on a fixed lower support block secured to the fixed platen 17 (see FIG. 2). The spring means 6 normally holds the mold core pin 10 in a position slightly above the mold cavity so that the mold core pin 10 and the molded part formed thereon are clear of the surface of the mold section (see FIG. 9). The upper mold section 14 mounted on a movable platen 15 then moves downwardly and a chain centering bar 16 mounted on the upper mold section engages the link chain 11 and depresses the mold core pins 10 extending inwardly from the rear of the mold into the mold cavities of the lower mold section 13 mounted on a fixed platen 17 and the mold core pins 10 are accurately centered in the mold cavity by suitable engaging means 18, 19.

The upper and lower mold sections 13, 14 each have formed in the forward end thereof semi-circular grooves 20, 21 which form when the mold sections 13, 14 are in closed position a receiver passage for an injection nozzle means through which plasticized molding material is introduced from a heated manifold assembly into each mold cavity. The receiver passage is adapted to provide a seat for and sealably engage an injection nozzle 25 through which the plasticized molding material is injected into the mold cavity formed when the mold sections 13, 14 are in sealable engagement.

The manifold assembly 30 is comprised of a heated manifold 31 which has a plasticizing cylinder 38 attached to the rear wall thereof by means of a plurality of bolts 32. Unplasticized thermoplastic material from a supply hopper 33 is heated by suitable means in the plasticizing cylinder 38 until plasticized or flowable under the pressure exerted by a piston 34 actuated by means of a hydraulic cylinder 35. The manifold 31 is supported spaced from its outer end by means of cradle support 36 and at the inner end by a plurality of springs 37 mounted in the lower surface of the manifold 31; thereby permitting the manifold assembly 30 to move in a plane generally perpendicular to the parting line of the mold sections.

The manifold 31 as best shown in FIG. 2, has a passage 39 extending through the rear wall thereof which is connected with the outlet 40 of the plasticizing cylinder 38 and extends inwardly to a longitudinal extending header 42. At spaced points along the length of the header 42 are a plurality of perpendicular feeder passages 43 which extend through the upper surface of the manifold 31. Each of the feeder passages 43 is adapted to convey plasticized thermoplastic material to one of the spaced manifold caps or nozzle elements 45 mounted on the upper surface of the manifold. A plurality of adjusting screws 46 maintain the nozzle elements 45 accurately positioned on the upper surface of the manifold 31.

The main body of the manifold caps or nozzle elements 45 each have a generally rectangular cross section with a truncated conical forwardly extending section 47 from which the injection nozzle 25 extends axially. Each of the injection nozzles 25 are comprised of a small diameter thin wall, heat conductive, tubular section 48 (approx. .035 inch I.D. and .050 O.D.) having the lateral walls tapered sharply inwardly at the outer end 49 to provide a reduced diameter outlet (approx. .025 inch) and a flattened outer end wall. The axial passage through the tubular section 48 conveys plasticized molding material from the feeder passage 43 in the upper surface of the manifold 31 to the small diameter tubular section 48. The length and diameter of the small diameter injection tubular section 48 is such that the tube is sealably disposed in the receiver passage formed by the mold sections 13, 14 when the mold is closed with the flat end surface of the tubular section 48 extending inwardly exactly to the surface of the mold cavity or area into which the plastic is injected.

A manifold cap centering block 50 is mounted at each end of the upper surface of the manifold 31. Each of the centering blocks 50 is rectangular in cross section at the forward end thereof and extends above the upper edge of the tapered section 47 of the nozzle elements 45 mounted on the upper surface of the manifold 31 between the spaced centering blocks 50. The centering blocks 50 provide an abutment surface which is engaged by an upper centering bar 51 mounted on the forward wall of the upper mold section 14, and a lower centering bar 52 mounted on the lower mold section 13, as will be described hereinafter.

A manifold positioning rod 60 extends axially outwardly from each end of the manifold 31 and is adapted to be held in a manifold centering block 65 mounted on the lower platen 17 by suitable bolts and cap screws 66 and spaced from each end of the manifold 31. A plurality of spaced mounting holes 67 are formed in the platen 17 to permit moving the manifold centering block 65 toward and away from the mold sections 13, 14, a considerable distance to accommodate the manifold 31 to molds of various sizes. The manifold centering blocks 65 are provided with additional means for effecting minor movement and accurate adjustment of the manifold 31 toward and away from the mold section, as well as transversely with respect to the mold sections. Thus, as best shown in FIGS. 6 and 7, the inner surface of each of the manifold centering blocks 65 is provided with a recess in which an insert member 68 is adjustably held. Each insert member 68 is adapted to support the end of one of the manifold positioning rods 60. The insert members 68 and thus the entire manifold 31 are movable toward and away from the mold sections 13, 14, by means of the oppositely disposed set screws 70, which engage the opposite surfaces of the insert member 68, and the insert member 68 is securely held in its adjusted position by means of bolts 71 extending through the parallel slots 72 in the end wall of each of the mold centering blocks 65. The manifold 31 is adjustably moved transversely with respect to the mold by means of a positioning screw 75 mounted in the threaded sleeve section 76 of each insert member which extends through an axial opening 77 in the end wall of the manifold centering block 65, and slidably engages the end of the manifold positioning rod 60. The vertical movement of the manifold positioning rod 60 is limited by means of the vertical set screw 78 extending downwardly through the upper wall of each of the mold centering blocks 65.

As best shown in FIG. 4, the lower surface of the manifold 31 is provided with three insulating sections 80, such as blocks of transite, which are secured to the lower surface of the manifold 31 by metal plates 81. A heat insulating sheet 86 is secured to the foreward wall of the manifold 31. Insulating sections 80 and plates 81 have one or more recessed areas in which cups 82 are mounted with a spring element 37 disposed in each of the cups 82. The spring elements 37 extend outwardly beyond the lower edge of the cups 82 and are adapted to resiliently support the manifold assembly 30 on the platen 17. The supporting spring elements 37 are of sufficient size and strength to normally hold the small diameter injection nozzles 25 above and out of contact with the surface of the lower mold section 13 when the mold sections are in open position, while permitting the manifold assembly 30 to be moved downwardly by the upper centering bar 51 so that the small diameter injection nozzles 25 form a sealable engagement with the mold sections when the mold is in closed position.

In adjusting the manifold caps or nozzle elements 45 to properly align the tubular elements 48 with the receiver passages formed by the mold sections, the adjusting screws 46 holding the manifold caps 45 on the upper surface of the manifold 31 are loosened. The manifold is heated to its operating temperature and the mold sections are cooled to their operating temperature. When the manifold 31 reaches operating temperature the adjusting screws 78 on the top of the manifold centering block 65 are screwed in, thus lowering the manifold cap centering bars 50 preferably into contact with the lower centering bar 52 on the lower mold section 13. The nozzle elements 25 of the manifold caps 45 are then placed in the semi-circular groove 20 in the lower mold section 13. The manifold 31 is then adjusted by means of the screws 70 in the manifold centering block 65 so that the end of the tubular element 48 is aligned with the inside edge of the mold cavity. The manifold 31 is moved so that the tubular element 48 is axially aligned with the axis of the groove 20 using the screws 75 and the screws 46 holding the manifold caps 45 on the upper surface of the manifold 31 are then tightened, locking the manifold caps 45 in position. The adjusting screws 78 on the top of the manifold centering block 65 are then loosened. The manifold 31 does not raise because of the locking effect of the adjusting screws 75 at the ends of the positioning rod 60 which extend axially from the ends of the manifold 31. The adjusting screw 75 at the ends of the positioning rods 60 are loosened slightly so that there is a clearance of about 0.001 inch between the ends of the screws and the end wall of the rods 60 to permit vertical movement of the rod 60 and the manifold 31 to which the rods are secured by means of bolt 69. This allows the springs elements 37 to raise the manifold 31. The screws 78 extending downwardly from the top of the manifold centering block 65 are adjusted to give a clearance of about 0.015 inch between the manifold cap centering blocks 50 and the lower centering bar 52 of the lower mold section 13. The mold and manifold 31 are now in proper alignment and adjustment for the molding operation.

The foregoing adjustments are suitable for molding a particular plastic at a given temperature. If a different plastic is to be molded which has a substantially different molding temperature thermal expansion causes the manifold 31 with its injection nozzle elements to move out of alignment, and it is necessary to readjust the manifold in the above described manner.

In injection molding with the foregoing apparatus, the link chain 11 is first engaged by the chain centering bar 16 to properly position the mold core pins 10 in the lower mold section 13. The upper mold centering bar 51 secured to the upper mold section 14 is lowered and engages the manifold cap centering blocks 50, forcing the manifold 31 downwardly. When the upper mold centering bar 51 engages the manifold cap centering blocks 50, the upper half of the tubular section 48 of the injection nozzle 25 is seated in the groove 21 in the upper mold section 14. As the mold is closed, the lower half of the tubular section 48 is seated and sealably clamped in the groove 20 formed in the lower mold section 13. The instant the mold sections sealably close the thermoplastic molding material injection is started. If there is any delay in injecting the molding material will freeze in the tubular section 48 and injection of molding material is prevented. When the molding material injection is started as soon as the mold sections close, the molding material will flow into and fill the mold cavity, despite the cooling effect of the mold on the tubular section 48, since the velocity of the inwardly flowing heated molding material prevents freezing of the molding material in the tubular section 48. As soon as the mold cavity is filled with molding material, the flow thereof stops and during the period required for the piston 34 to withdraw and during the holding period which allows the molded part to solidify, the molding material in the tubular section 48 is cooled and at least partially solidified.

When the upper section 14 of the mold is elevated after the molding material has solidified in the mold, the tubular section 48 and the molded part will raise simultaneously for a distance of about 0.015 of an inch. At that point manifold 31 will have reached its maximum heighth, as the upward movement of manifold 31 by spring elements 37 is limited by the set screws 78. The spring means 6 lifts the bar 5 and raises the chain 11 supporting the core pin 10 and the molded plastic part above the surface of the lower mold section 13. The mold section 14 will continue to raise with the plastic part held therein due to spring means 6 moving the bar 5 and the chain 11 supporting the core pin 10 and the molded plastic part upwardly. This movement of the molded plastic part relative to the manifold 31 and the tubular section 48 causes the solidified molding composition at the end of the tubular element 48 to be sheared cleanly at the end of the tubular section due to the shearing action of the end of the tubular section 48. If the molding composition in the tubular section 48 were not at least partially solidified and remained at the elevated temperature of the plastic in the heated manifold 31, there would be a tendency for the molding composition to be pulled out of the end of the tubular element 48, leaving a pointed end on the molded part or a thread of molding composition extending therefrom which would have to be removed in a finishing operation. As the upper mold section 14 continues to rise, the molded part held on the mold core pin is restrained by the link chain 11 and is withdrawn from the upper mold cavity. When the link chain 11 is at maximum heighth the link chain 11 with the mold core pins 10 and molded parts are elevated above the lower mold section so as to permit movement of the mold core pins and molded parts longitudinally away from the mold sections. It will be evident that as soon as the tubular section 48 of the injection nozzle 25 is raised out of contact with the mold sections, heat flows from the manifold cap 45 and softens the solidified molding composition in the tubular element 48 so that it is sufficiently softened to be flowable under the pressure of the plasticized molding composition at the beginning of the ensuing molding cycle.

I claim:

1. In an injection molding apparatus having a sectional mold and a manifold assembly with injection means for periodically supplying heated plastic molding material to said mold during a molding cycle, the improvement comprising; mold sections movable into sealing engagement to form a mold cavity having an injection nozzle receiver section, said manifold assembly having means for heating said plastic molding material and having a tubular injection nozzle extending into said receiver section and terminating at an edge of said mold cavity for supplying said heated plastic molding material directly to said mold cavity to form solidified plastic molding material therein, said mold sections forming a sealing engagement with said injection nozzle within said receiver section when said mold sections are in said sealing engagement, and means for moving said solidified plastic molding material relative to said nozzle in a plane perpendicular to the plane of the longitudinal axis of said nozzle to effect shearing of said solidified plastic molding material at said edge of the mold cavity.

2. An injection molding apparatus as in claim 1, wherein at least one of said mold sections with said solidified plastic molding material remaining in contact therewith is movable relative to said nozzle to effect said shearing of solidified plastic molding material at said edge of the mold cavity.

3. A molding apparatus as in claim 1, wherein said tubular injection nozzle has a substantially flat end wall with the lateral wall thereof increasing in thickness adjacent said end wall to provide a tapered axial discharge passage at the outer end thereof, and said wall defining said discharge passage providing a shearing surface at the outer end of said nozzle which facilitates said shearing of said solidified plastic molding material at said edge of the mold cavity.

4. A molding apparatus as in claim 1, wherein said apparatus has means for moving said injection nozzle in a plane generally perpendicularly to the plane of parting of said mold sections and in the direction in which one of said mold sections is moved to effect moving said nozzle out of contact with said mold sections when said mold sections are moved out of sealing engagement.

5. An injection molding apparatus as in claim 1, wherein said injection nozzle comprises a thin wall heat conductive tubular section through which heat is extracted while said mold sections adapted to having an operating temperature below the temperature of said heated plastic molding material are in sealable engagements therewith to effect at least partial solidification therein of said molding material therein and said tubular section effecting heating of said molding material to plasticize said molding material by conducting heat from said manifold assembly when said mold sections are out of sealing engagement with said tubular section.

6. An injection apparatus as in claim 1, wherein said manifold assembly is yieldably supported independently of said mold on resilient means with said resilient means effecting transverse movement of said manifold assembly relative to at least one said mold section when said mold sections are moved out of sealing engagement.

7. An injection molding apparatus as in claim 6, wherein said resilient means comprises a spring means which is compressed by means associated with one of said mold sections.

8. An injection molding apparatus as in claim 1, wherein said manifold assembly has at each opposite longitudinal end thereof a positioning rod extending outwardly therefrom with each said rod mounted in a manifold centering block adapted to adjustable movement relative to said mold sections.

9. An injection molding apparatus as in claim 1, wherein said manifold assembly has a plurality of manifold caps each having a said injection nozzle extending outwardly therefrom providing the only contact between said assembly and mold sections, and each said injection nozzle being movable out of contact with said mold sections when said mold sections are moved out of sealing engagement.

10. An injection molding apparatus as in claim 9, wherein each of said manifold caps is individually adjustably mounted for movement relative to said mold sections.

References Cited

UNITED STATES PATENTS

| | | |
|---|---|---|
| 3,145,244 | 8/1964 | Morin. |
| 3,189,945 | 6/1965 | Strauss. |
| 3,327,354 | 6/1967 | Son et al. _____ 18—30 |
| 3,335,464 | 8/1967 | Schnartz _____ 18—30 |
| 3,425,095 | 2/1969 | Kotek. |
| 2,814,831 | 12/1957 | McKee _____ 18—30 |
| 3,052,925 | 9/1962 | Bromenkant et al. |
| 3,135,993 | 6/1964 | Ryan _____ 18—5 |

FOREIGN PATENTS

| | | |
|---|---|---|
| 960,308 | 6/1964 | Great Britain. |
| 12,473 | 3/1964 | Japan. |

J. SPENCER OVERHOLSER, Primary Examiner

M. O. SUTTON, Assistant Examiner

U.S. Cl. X.R.

18—5